(12) United States Patent  
Shao

(10) Patent No.: US 8,830,999 B2  
(45) Date of Patent: Sep. 9, 2014

(54) DYNAMIC UPDATING OF A LABEL SWITCHED PATH

(75) Inventor: Mingchao Shao, Beijing (CN)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 187 days.

(21) Appl. No.: 13/505,770

(22) PCT Filed: Jul. 6, 2011

(86) PCT No.: PCT/CN2011/001114  
§ 371 (c)(1),  
(2), (4) Date: May 3, 2012

(87) PCT Pub. No.: WO2013/003981  
PCT Pub. Date: Jan. 10, 2013

(65) Prior Publication Data  
US 2013/0010790 A1    Jan. 10, 2013

(51) Int. Cl.  
*H04L 12/28* (2006.01)  
*H04L 12/56* (2006.01)  
*H04L 12/18* (2006.01)

(52) U.S. Cl.  
CPC .............. *H04L 12/185* (2013.01); *H04L 45/50* (2013.01); *H04L 45/16* (2013.01)  
USPC ............ 370/390; 370/432; 370/256; 370/254

(58) Field of Classification Search  
CPC .................................................. H04L 12/4633  
See application file for complete search history.

(56) References Cited

U.S. PATENT DOCUMENTS

| | | | |
|---|---|---|---|
| 7,477,642 B2 | 1/2009 | Aggarwal et al. | |
| 7,772,879 B1 | 8/2010 | Feng et al. | |
| 7,863,931 B1 | 1/2011 | Zhang et al. | |
| 2004/0233907 A1* | 11/2004 | Hundscheidt et al. | 370/390 |
| 2005/0249233 A1* | 11/2005 | Akaba et al. | 370/432 |
| 2006/0221859 A1 | 10/2006 | Bijwaard et al. | |
| 2007/0177594 A1* | 8/2007 | Kompella | 370/390 |
| 2007/0280140 A1* | 12/2007 | Venketesan et al. | 370/254 |
| 2009/0232031 A1* | 9/2009 | Vasseur et al. | 370/256 |
| 2009/0292917 A1* | 11/2009 | Lebovitz et al. | 713/160 |
| 2013/0010790 A1* | 1/2013 | Shao | 370/390 |

FOREIGN PATENT DOCUMENTS

| | | |
|---|---|---|
| EP | 1330069 A3 | 12/2005 |
| WO | WO2006045356 A1 | 5/2006 |
| WO | WO2006107694 A1 | 10/2006 |

* cited by examiner

*Primary Examiner* — Robert Wilson

(57) ABSTRACT

A request to add or remove a leaf node to a multicast group in a Point-to-Multipoint Label Switched Path is detected, and the leaf node can select a pre-configured tunnel in accordance with the requested multicast group. The leaf node encapsulates the received request and transmits it through the selected pre-configured tunnel. A root node for the multicast group receives the request through the tunnel and can identify the leaf node responsible for transmitting the message by the tunnel header. The root can determine if a Point-to-Multipoint Label Switched Path exists for the request multicast group and can update the membership of the multicast group by adding or removing the leaf node to the multicast group.

19 Claims, 7 Drawing Sheets

DYNAMIC UPDATING OF A LABEL SWITCHED PATH

TECHNICAL FIELD

The present invention relates generally to Label Switched Paths and, more particularly, to procedures and mechanisms for constructing Point-to-Multipoint trees.

BACKGROUND

The Multi-Protocol Label Switching (MPLS) protocol is used to forward data in a network based on labels that are attached to each packets. A Label Switched Path (LSP) is comprised of a set of labels which are assigned at each hop of the path. Service providers employ a variety of types of tunnels, such as Point-to-Point, Point-to-Multipoint, and Multipoint-to-Multipoint LSPs, depending on the type of traffic to be carried. A Point-to-Multipoint (P2MP) LSP is most suitable for multicast services, such as Internet Protocol Television (IPTV), Content Delivery Networks, etc.

A P2MP LSP has a root node and multiple leaf nodes, and one or more branch node along the path from root node to leaf nodes, see FIG. 1 for a diagram of an exemplary MPLS network. At a branch node, one incoming packet can be replicated on multiple outgoing interfaces, each replication having a unique label.

An LSP can be established statically by the configuration of management layers, or dynamically by signaling protocols.

Label Distribution Protocol (LDP) extensions for Point-to-Point and Multipoint-to-Multipoint LSPs can be used as a signaling protocol to establish a P2MP LSP. These extensions are referred to as Multicast LDP (mLDP). With mLDP, a leaf node can decide to join or leave a P2MP LSP dynamically based on a trigger detected at the leaf node. However the path from root to leaf will follow the best route as calculated by routing protocols without provisioning Traffic Engineering parameters (e.g. bandwidth reservation).

Extensions to the Resource Reservation Protocol-Traffic Engineering (RSVP-TE) can also be used to establish a P2MP LSP. An advantage of RSVP-TE is that Traffic Engineering parameters can be provisioned along the path, which optimizes network performance and best serves the Quality of Experience requirement of IPTV. A disadvantage of RSVP-TE is that each leaf node requesting to join the P2MP LSP must be explicitly configured at the root node, by the operator or a configuration process, which makes it impossible for leaf nodes to dynamically join (or leave) the P2MP LSP. In one example, if a leaf node is added or removed, the whole LSP tree is recalculated, the old tree is deleted, and the new recalculated tree is signaled to the participating nodes. Such a solution leads to effective bandwidth management and optimizes resource usage in the network, but requires heavy overhead manual configuration in the set-up.

U.S. Pat. No. 7,801,137 to Vasseur et al only partially addresses this problem by allowing a leaf node to determine the root node of a requested multicast group. A request is sent to the root node, using a proprietary protocol, to request a path between the leaf node and a tunnel tree of the multicast group. If such a tunnel tree exists, the root node computes a path to add the leaf node to the tree and sends a reply to add the leaf node to the tree at a selected node of the tree. The leaf node can then be added to the multicast group tunnel tree over the computed path at the selected node.

At present, there is no mechanism supported by an open standard group for dynamically provisioning a RSVP-TE P2MP LSP using standard protocols. Accordingly, it should be readily appreciated that in order to overcome the deficiencies and shortcomings of the existing solutions, it would be advantageous to have a solution for dynamically adding or removing leaf nodes in a P2MP LSP using RSVP-TE.

SUMMARY

It is an object of the present invention to obviate or mitigate at least one disadvantage of the prior art.

In a first aspect of the present invention there is provided a method for initiating an update of a multicast group, by a leaf node, comprising the steps of receiving a request for a multicast group, the request including an identifier for the multicast group; selecting a pre-configured tunnel in accordance with the identifier for the multicast group; encapsulating the received request; and transmitting the encapsulated request through the selected pre-configured tunnel. The received request can be a join request message or a leave request message. The request can be detected by using Internet Group Management Protocol (IGMP) snooping, Multicast Listener Detection (MLD) snooping, or Protocol Independent Multicast (PIM) snooping. The step of encapsulating can include placing the received request in a payload of a tunnel packet. The encapsulated request can be transmitted through the selected pre-configured tunnel without specifying a destination address for the encapsulated request. The pre-configured tunnel can allows the encapsulated request to travel to the destination without interception by an intermediate node.

In another aspect of the present invention there is provided a method for updating a multicast group, by a root node, comprising the steps of receiving a request through a tunnel, the request including an identifier for a multicast group; identifying a leaf node responsible for transmitting the request in accordance with a tunnel header of the received request; determining if a Point-to-Multipoint (P2MP) Label Switched Path (LSP) exists for the multicast group; and in response to the multicast group having an existing P2MP LSP, updating a membership of the multicast group, by adding the leaf node to the multicast group or removing the leaf node from the multicast group, in accordance with the received request. The leaf node can be added to the P2MP LSP using Resource Reservation Protocol-Traffic Engineering (RSVP-TE). The identifier for the multicast group can be extracted from a payload of the received request using IGMP snooping, MLD snooping, or PIM snooping. In response to the multicast group not having an existing P2MP LSP, a new P2MP LSP can be established for the multicast group including the leaf node. In response to the leaf node being the last node to leave the P2MP LSP, the P2MP LSP for the multicast group can be terminated.

In another aspect of the present invention there is provided a leaf node comprising a network interface for receiving a request for a multicast group, the request including an identifier for the multicast group; a memory for storing a tunnel database; and a processor for selecting a pre-configured tunnel from the tunnel database in accordance with the identifier for the multicast group, encapsulating the received request, and instructing the network interface to transmit the encapsulated request through the selected pre-configured tunnel. The received request can be a join request message or a leave request message. The processor can instruct the network interface to transmit the encapsulated request through the selected pre-configured tunnel without specifying a destination address for the encapsulated request.

In another aspect of the present invention there is provided a root node, comprising a network interface for receiving, through a tunnel, a request for updating a multicast group; a memory for storing a database including a multicast group identifier, a multicast group membership, and any associated Point-to-Multipoint (P2MP) Label Switched Path (LSP); and a processor for identifying a leaf node responsible for transmitting the request in accordance with a tunnel header of the received request; determining if an associated P2MP LSP exists for the requested multicast group; and in response to the requested multicast group having an existing associated P2MP LSP, updating the multicast group membership, by adding the leaf node to the multicast group or removing the leaf node from the multicast group, in accordance with the received request. The leaf node can be added to the P2MP LSP using RSVP-TE. In response to the requested multicast group not having an existing associated P2MP LSP, the processor can instruct for the establishment of a new P2MP LSP for the requested multicast group including the leaf node. In response to the leaf node being the last node to leave the requested multicast group, the processor can instruct for the termination of the associated P2MP LSP for the requested multicast group.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Embodiments of the present invention are generally directed to a system and method for dynamically updating the membership of a P2MP LSP in a MPLS network.

Figure 1:
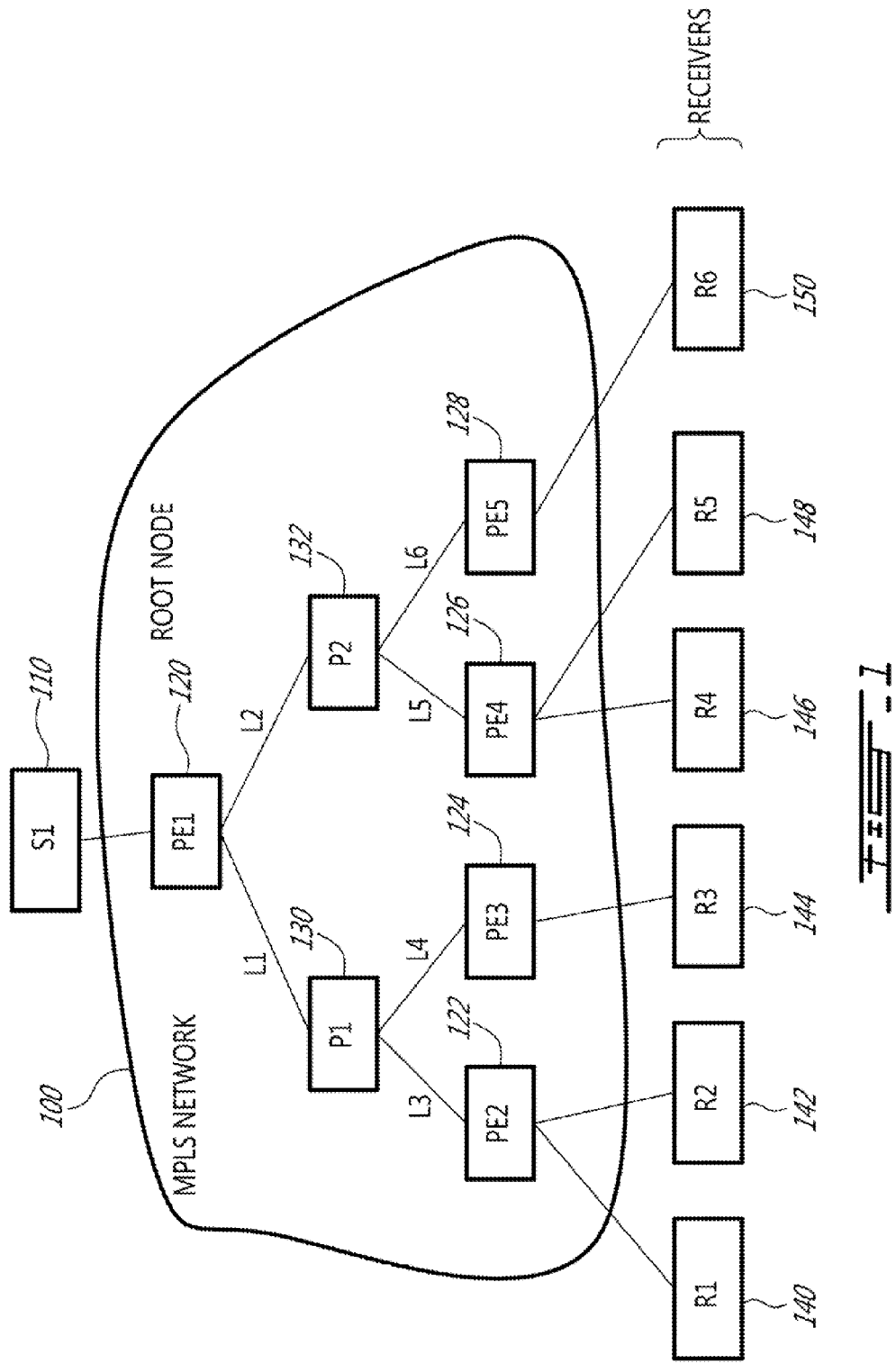
FIG. 1 illustrates an example computer network.

FIG. 1 is a diagram of an exemplary MPLS network in which embodiments of this invention can operate. An MPLS network 100 includes a set of Label Edge Routers (PE1 120 through PE5 128) and a set of Label Switched Routers (P1 130 and P2 132). Data packets can be exchanged among the nodes/devices using a predefined network protocol such as MPLS. An Edge Router device forward packets between MPLS network 100 and external devices. Label Switched Routers forward packets to devices within the MPLS network 100 in accordance with the labels attached to the packets. Those skilled in the art will appreciate that any number of nodes, devices, and links may be used in a network.

To transmit multicast packets from a source node S1 110 to interested user devices, receivers R1 140 through R6 150, a P2MP LSP can be established with PE1 120 as the root node and PE2 122 through PE5 128 as leaf nodes. The P2MP LSP consists of a set of labels; each node along the P2MP LSP maintains a label mapping entry for the P2MP LSP. For instance, at P1 130 the label mapping is [L1→L3, L4]. A node with multiple outgoing labels is called a branch node (e.g. PE1 120, P1 130 and P2 132). Edge Router PE1 120 receives multicast packets from source S1 110. At each branch node, each multicast packet is replicated, attached with a label, and sent to each of the receivers R1 140 through R6 150.

The P2MP LSP may be manually configured at each node along the path, or signaled using a signaling protocol, as previously discussed, such as mLDP or RSVP-TE. With RSVP-TE, Traffic Engineering parameters such as bandwidth reservation can be provisioned along the path, which best serves the Quality of Experience requirement of IPTV.

In an embodiment of the present invention, Internet Group Management Protocol (IGMP) snooping or Multicast Listener Detection (MLD) snooping or Protocol Independent Multicast (PIM) snooping can be used at leaf nodes PE2 120 through PE5 128 to detect join requests from end receiver nodes R1 140 through R6 150. Snooping is a feature that allows a network device to listen in on the IGMP conversation between hosts and routers. By listening to these conversations the device maintains a map of which links need which IP multicast streams, and multicasts may be filtered from the links which do not need them. A join request message can include one or more headers, the receiver's address, the requested multicast group also referred to as "(S,G)", and other fields. Those skilled in the art will appreciate that the format of the join request message is not germane to the operation of the present invention.

A IGMP/MLD/PIM Join message detected by a leaf node is encapsulated and transmitted to the root node PE1 120 through a pre-established tunnel (e.g. LSP, Pseudo Wire, GRE, etc). On receiving the encapsulated IGMP/MLD/PIM Join message through the tunnel, the root node PE1 121 can use the tunnel header to identify the particular leaf node, and perform a look-up to determine if a P2MP LSP exists for the (S,G) contained in the IGMP/MLD/PIM Join message. If no P2MP LSP associated with (S,G) exists, the root node will initiate a new P2MP LSP establishment using RSVP-TE. If a P2MP LSP exists for the (S,G), the root node will add the leaf node to the P2MP LSP using RSVP-TE. According to this embodiment, the pre-established tunnel is used to transmit control packets, such as the IGMP/MLD/PIM Join messages. A P2MP LSP for forwarding source-specific multicast traffic can be established dynamically by the root node using RSVP-TE, or a leaf node can be added to an existing P2MP LSP by the root node using RSVP-TE. Different multicast groups (S,G) may have different or the same P2MP LSP established depending on the configuration.

In another embodiment of this invention, IGMP/MLD/PIM snooping can be used at leaf nodes PE2 120 through PE5 128 to detect leave or prune request from end receiver nodes R1 140 through R6 150. The IGMP/MLD Leave or PIM Prune messages are encapsulated and forwarded to the root node PE1 120 through a pre-established tunnel. On receiving a IGMP/MLD Leave or PIM Prune message, the root node can identify the leaf node using the tunnel header, and remove the leaf node from the P2MP LSP using RSVP-TE. If the leaf node is the last node in the LSP, the P2MP LSP will be destroyed. According to this embodiment, a pre-established tunnel is used to transmit control packets, such as IGMP/MLD Leave or PIM Prune messages, and leaf nodes are dynamically removed from a P2MP LSP by the root node using RSVP-TE, or a P2MP LSP used to forward source-specific multicast traffic can be dynamically destroyed by the root node using RSVP-TE.

Figure 2:
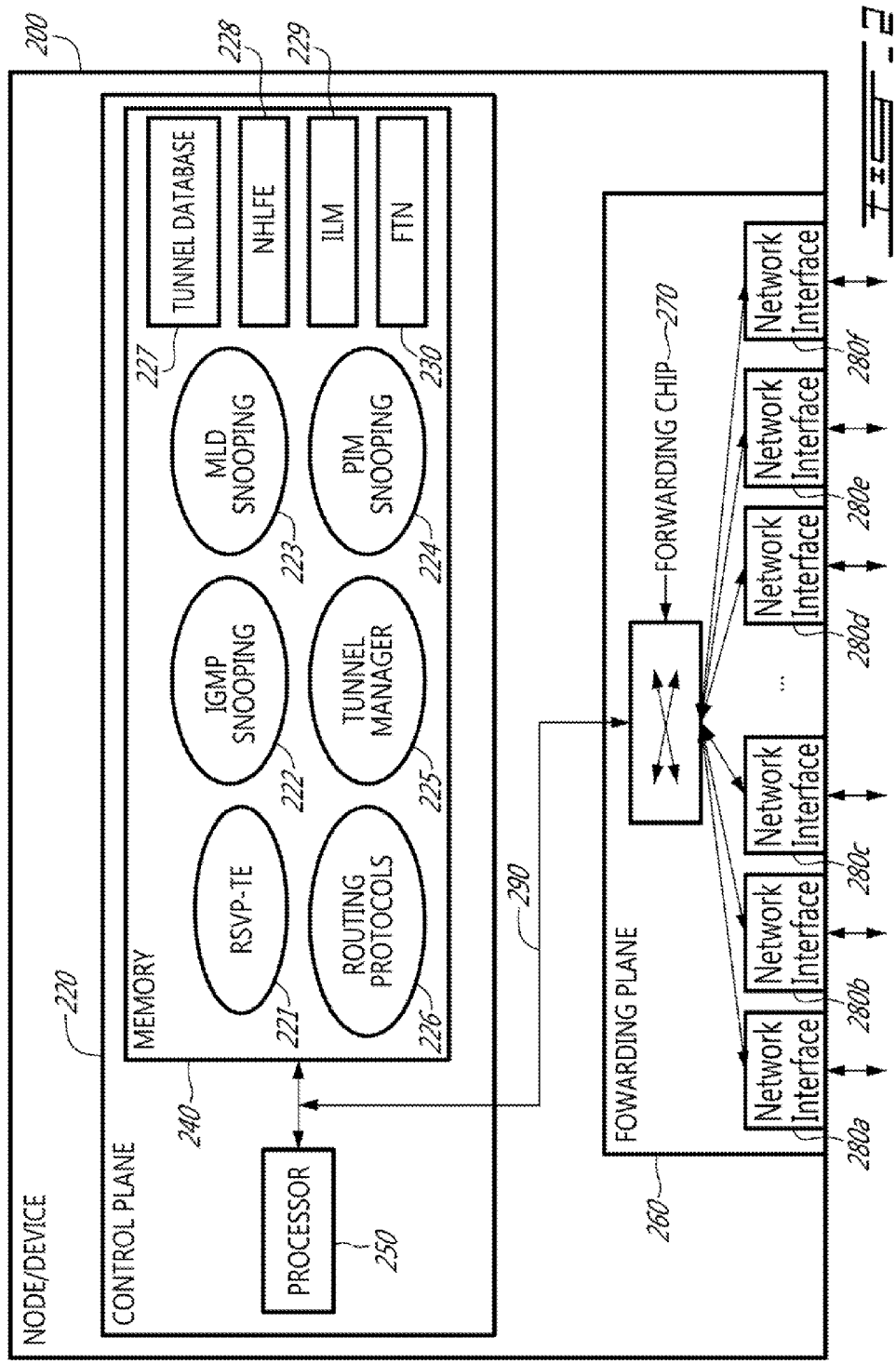
FIG. 2 illustrates an example network node/device.

FIG. 2 is a block diagram illustrating the control plane 220 and forwarding plane 260 of an exemplary network device/node 200 that can be used to implement embodiments of the present invention. The network device may be any Label Edge Router or Label Switched Router in the MPLS network 100 of FIG. 1.

The control plane 220 includes a set of processes or instructions, including 221 through 226, and data structures, including 227 through 230, stored in a memory or data repository 240 and executed by a processor 250. RSVP-TE 221 is used as signaling protocol for P2MP LSP. IGMP SNOOPING 222, MLD SNOOPING 223 and PIM SNOOPING 224 are used to detect Join or Leave/Prune messages. Tunnel Manger 225 is responsible for managing the tunnels stored in Tunnel Database 227. Routing Protocols 226 includes both unicast and multicast routing protocols. Next Hop Label Forwarding Entry (NHLFE) 228 is used when forwarding a labeled packet. NHLFE 228 contains information such as next hop, operation to perform on the packets label stack (e.g. push, swap and pop) and any other information necessary to dispose the packets to next hop. Incoming Label Mapping (ILM) 229 is used to map each incoming label to one or more NHLFE 228. Forwarding Equivalent Class to NHLFE (FTN) 230 maps each Forwarding Equivalent Class to one or more NHLFE 228. It is used when packets arrive unlabeled, but which are required to be labeled before being forwarded to next hop.

The forwarding plane 260 consists of a forwarding chip 270 and a set of network interfaces 280a through 280f. The forwarding chip 270 is responsible for sending and receiving packets between the network interfaces 280 and the control plane interface 290, based on information from the control plane 220.

It will be appreciated by those skilled in the art that while FIG. 2 shows one exemplary embodiment of a Label Switched Router or a Label Edge Router, alternative embodiments may be implemented differently (e.g. having more or less processes, more or less data structures, more or less network interfaces, etc.).

FIGS. 3 through 6 are flow diagrams illustrating exemplary methods that can be performed by a Label Edge Router, such as network node 200, according to various embodiments of the present invention. These processes may be performed by processing logic that may comprise hardware (e.g. FPGA, ASIC, Network processor, etc), software (executable running on a system with processor and memory), or a combination of both.

Figure 3:
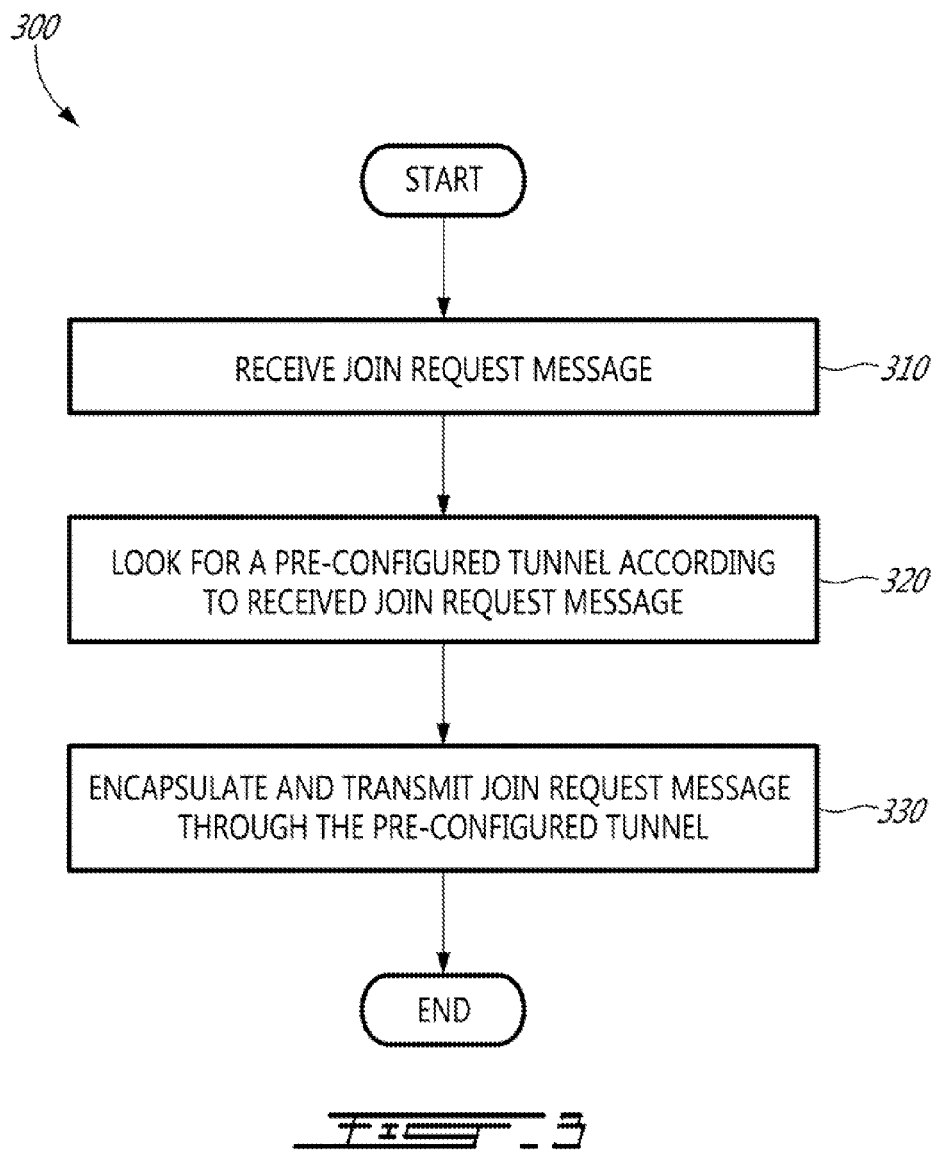
FIG. 3 illustrates an example procedure for a leaf node receiving a join request.

FIG. 3 is a flow diagram of one embodiment of a process 300 for a leaf node detecting a join request message and encapsulating and transmitting the join request to a root node through a pre-established tunnel to initiate an updating of the membership of a multicast group. A leaf node can use IGMP/MLD/PIM snooping, or a similar mechanism, to detect triggers from receivers wishing to join a multicast group or service. A leaf node detects and receives a join request message from a receiver in step 310. The join request can be a IGMP/MLD/PIM Join or any other appropriate message. Next, the leaf node looks for a pre-established tunnel in step 320 based on information associated with the received join request message. The information can include incoming port number, virtual local area network (VLAN), sub-interface, etc. The lookup of a pre-established tunnel can be based on pre-configured mapping information, such as a VLAN to tunnel mapping table, or determined through other methods. In a preferred embodiment, when looking for a pre-established tunnel, the leaf node will use the multicast group identifier (S,G) received in the join message as a key to a database or a look-up table, and select the tunnel in accordance to the multicast group requested. In the look-up table, tunnel identifiers and any appropriate tunnel encapsulation information can be stored. Alternatively, the tunnel encapsulation information can also be stored in a separate table, or tables, which are indexed by the tunnel identifier. For example, all LSP tunnel information can be stored a LSP tunnel database, and all GRE tunnel information can be stored in a GRE tunnel database.

Returning now to FIG. 3, in step 330 the leaf node encapsulates and transmits the join request message through the pre-configured tunnel. The original, received, join message can be encapsulated by placing it in the payload of a tunnel packet. The encapsulated join message is then sent via the tunnel. It is not necessary to know the root node IP address or any other identifier of the destination of the encapsulated join message. At this step, it is only required to have a tunnel identifier and any other information to encapsulate the tunnel payload and send it out via the network interface. The leaf node does not need to know the tunnel end point, only that it has selected the correct pre-established tunnel. Alternatively, in some network configurations it may be possible to query the tunnel end point's IP address from the tunnel identifier.

Figure 4:
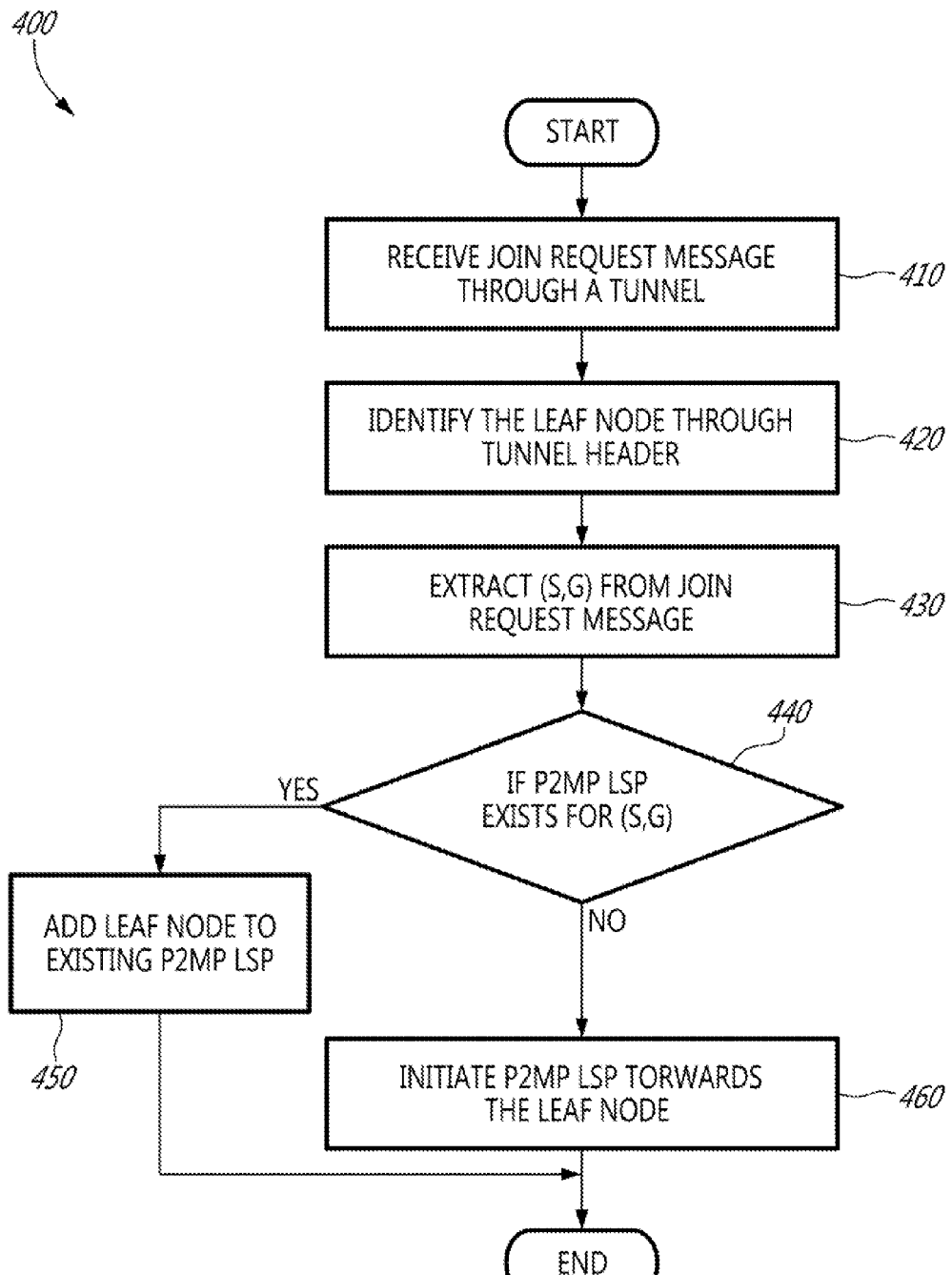
FIG. 4 illustrates an example procedure for a root node initiating or adding a leaf node to a P2MP LSP.

FIG. 4 is a flow diagram of one embodiment of a process 400 for a root node to update the membership of a multicast group by instantiating a new P2MP LSP or adding a leaf node into an existing P2MP LSP. A join request message is received by the root node through a tunnel in step 410. The root node can identify the leaf node responsible for sending the join request using the tunnel header or identifier of the received join message, in step 420. The root node can also extract information related to the multicast group requested (e.g. the (S,G)) from the join message in step 430. The root node may have a modified IGMP/MLD/PIM snooping function in order to be able to extract and process the trigger, as the join message can be a IGMP/MLD/PIM Join message encapsulated in the tunnel packet. In step 440, the root node determines if a P2MP LSP already exists for the (S,G). The determination if a P2MP LSP exists for the requested multicast group can be made by a look-up operation in a table or database. The root node can store a list of all P2MP LSPs in existence. The multicast group identifier can be used to index into the P2MP LSP table or database. The root node can also store membership information for the multicast group.

A policy can be used to determine whether a certain (S,G) is permitted to have a P2MP LSP, whether a particular (S,G) can share a P2MP LSP with any other (S,G), and the Traffic Engineering parameters which should be used for the P2MP LSP. This policy can be configured by a network device administrator, or can be determined by any other means.

In step 460, the root node determines that a P2MP LSP does not exist for the (S,G) indicated in the join message. The root node initiates a new P2MP LSP establishment using RSVP-TE towards the leaf node. Although only the one leaf node will exist at the time of establishment of the new P2MP LSP, it can still be configured as a P2MP as opposed to a Point-to-Point LSP, in order to allow more leaf nodes to join the P2MP at a later time.

The total number of allowed dynamically instantiated P2MP LSPs can be configured by a network device administrator. If the limit is reached, the request of instantiating a new P2MP LSP can be rejected. The administrator can be notified of this event by an alarm or other means, along with the information that triggered the instantiating of a new P2MP LSP.

In step 450, the root node determines that a P2MP LSP already exists for the (S,G) indicated in the join message. The root node updates the membership of the multicast group and adds the leaf node to the P2MP LSP using RSVP-TE.

Figure 5:
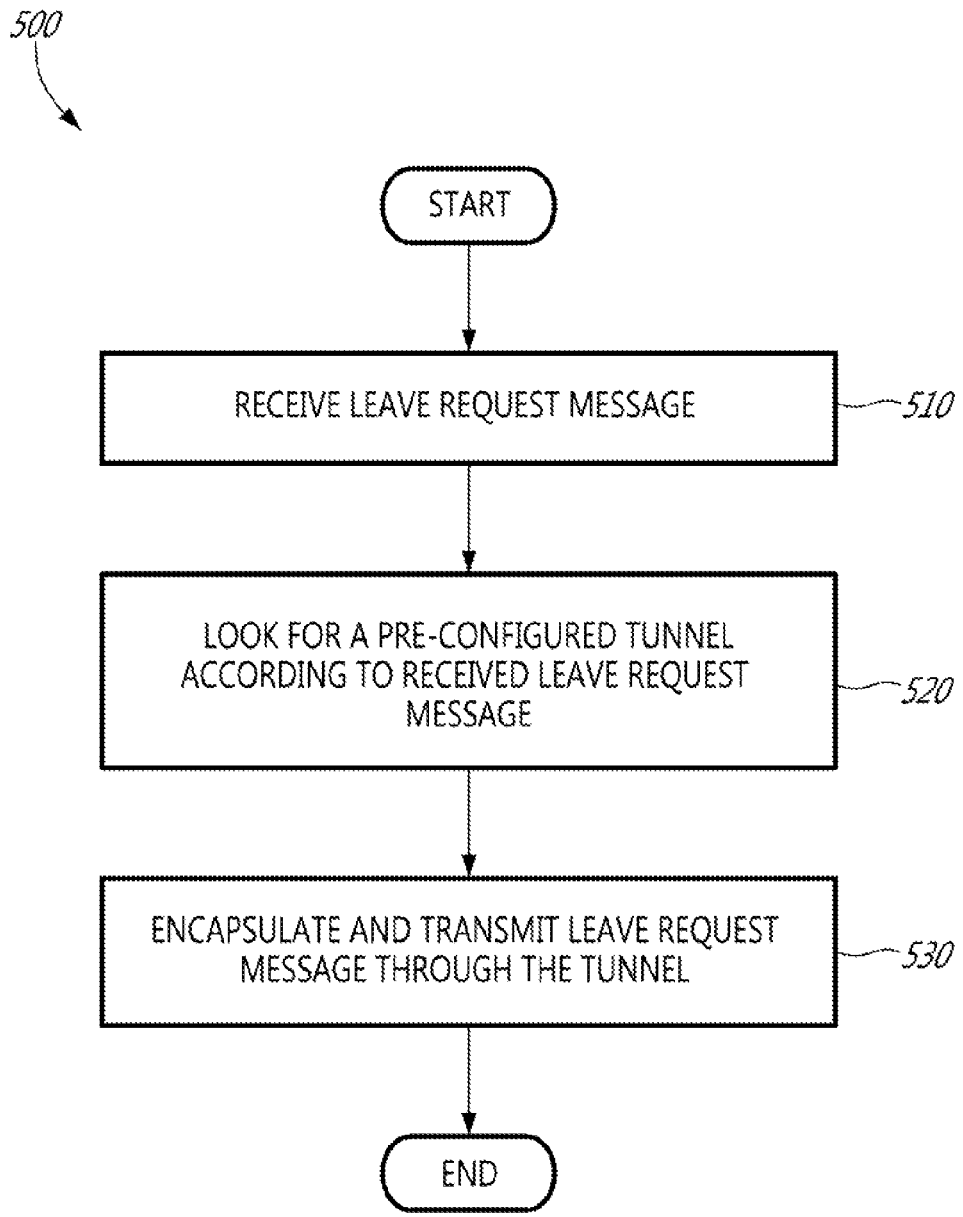
FIG. 5 illustrates an example procedure for a leaf node receiving a leave request.

FIG. 5 is a flow diagram of one embodiment of a process 500 for a leaf node detecting a leave message and encapsulating and transmitting the leave message to a root node through a pre-configured tunnel to initiate an updating of the membership of a multicast group. A leaf node can use IGMP/MLD/PIM snooping, or a similar mechanism, to detect triggers from receivers wishing to leave a multicast group or service. A leaf node detects and receives a leave request message from a receiver in step 310. The leave request can be an IGMP/MLD Leave or a PIM Prune or any other appropriate message. The leaf node looks for a pre-configured tunnel based on the information associated with the received IGMP/MLD Leave or PIM Prune message, such as incoming port, VLAN, sub-interface, etc in step 520. The lookup of a pre-configured tunnel can be based on pre-configured mapping information, such as a multicast group (S,G) to tunnel mapping table, or determined through other ways similar to those describes in FIG. 3. The leaf node then encapsulates and transmits the leave message through the selected pre-configured tunnel in step 530.

Figure 6:
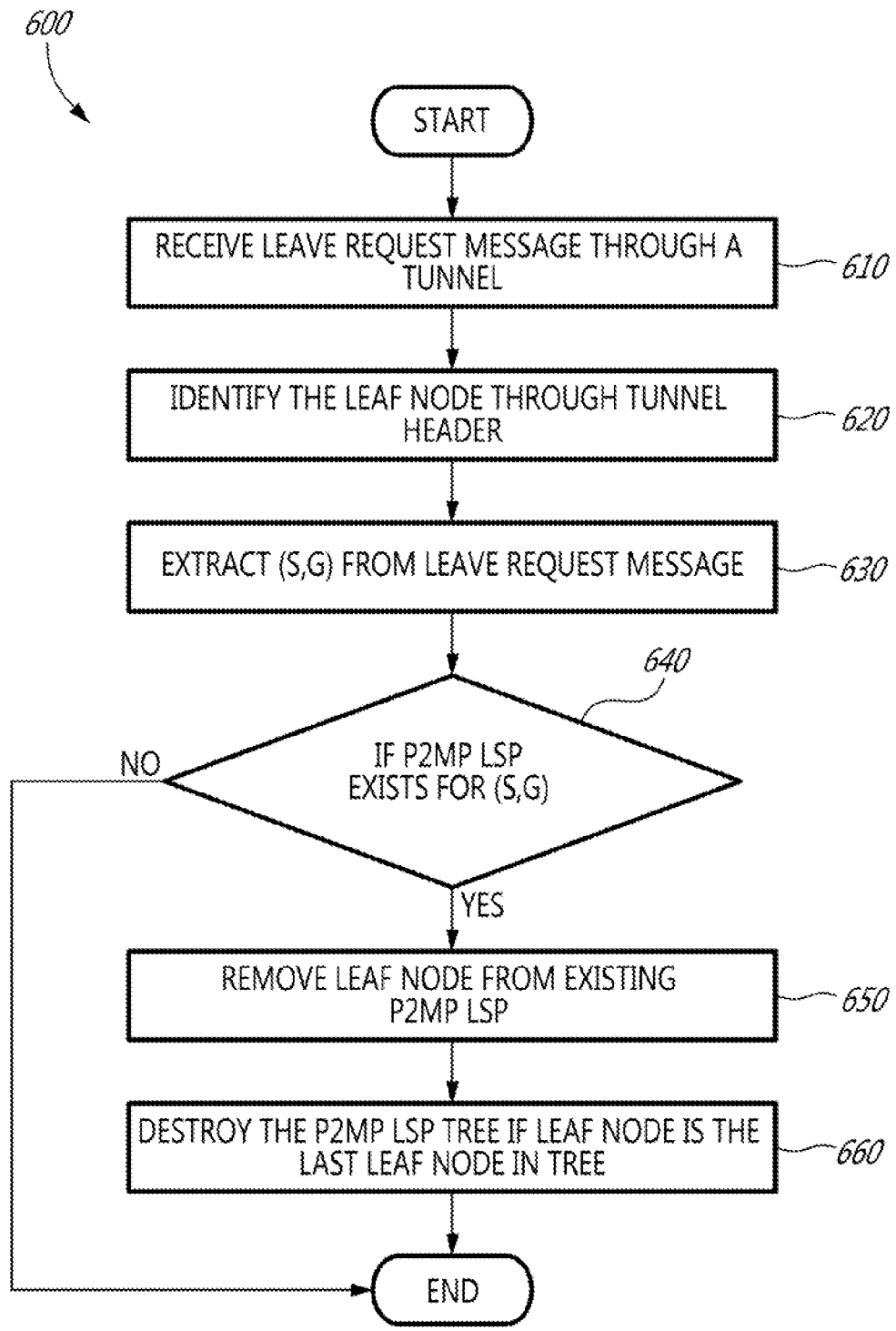
FIG. 6 illustrates an example procedure for a root node destroying or removing a leaf node from a P2MP LSP.

FIG. 6 is a flow diagram of one embodiment of a process 600 for a root node to update the membership of a multicast group by terminating a P2MP LSP or removing the leaf node from an existing P2MP LSP. A leave message is received by the root node through a tunnel in step 610. The root node can identify the leaf node using the tunnel header or identifier in step 620, and extract the request multicast group (S,G) from the leave message in step 630. Similar to FIG. 4, the root node may have a modified IGMP/MLD/PIM snooping function in order to be able to process the trigger, as the leave message can be an IGMP/MLD Leave or PIM Prune message and may have been encapsulated in a tunnel packet. In step 640, the root node will determine if a P2MP LSP exists for the (S,G). This can be determined by a look-up operation. If a P2MP for the (S,G) is found, and the leaf node is in the P2MP LSP, then the membership of the multicast group is updated and the leaf node is removed by the root node using RSVP-TE signaling, in step 650. If the leaf node is the last node in the P2MP LSP, the P2MP LSP can be terminated/destroyed/torn down by the root node in step 660.

Figure 7:
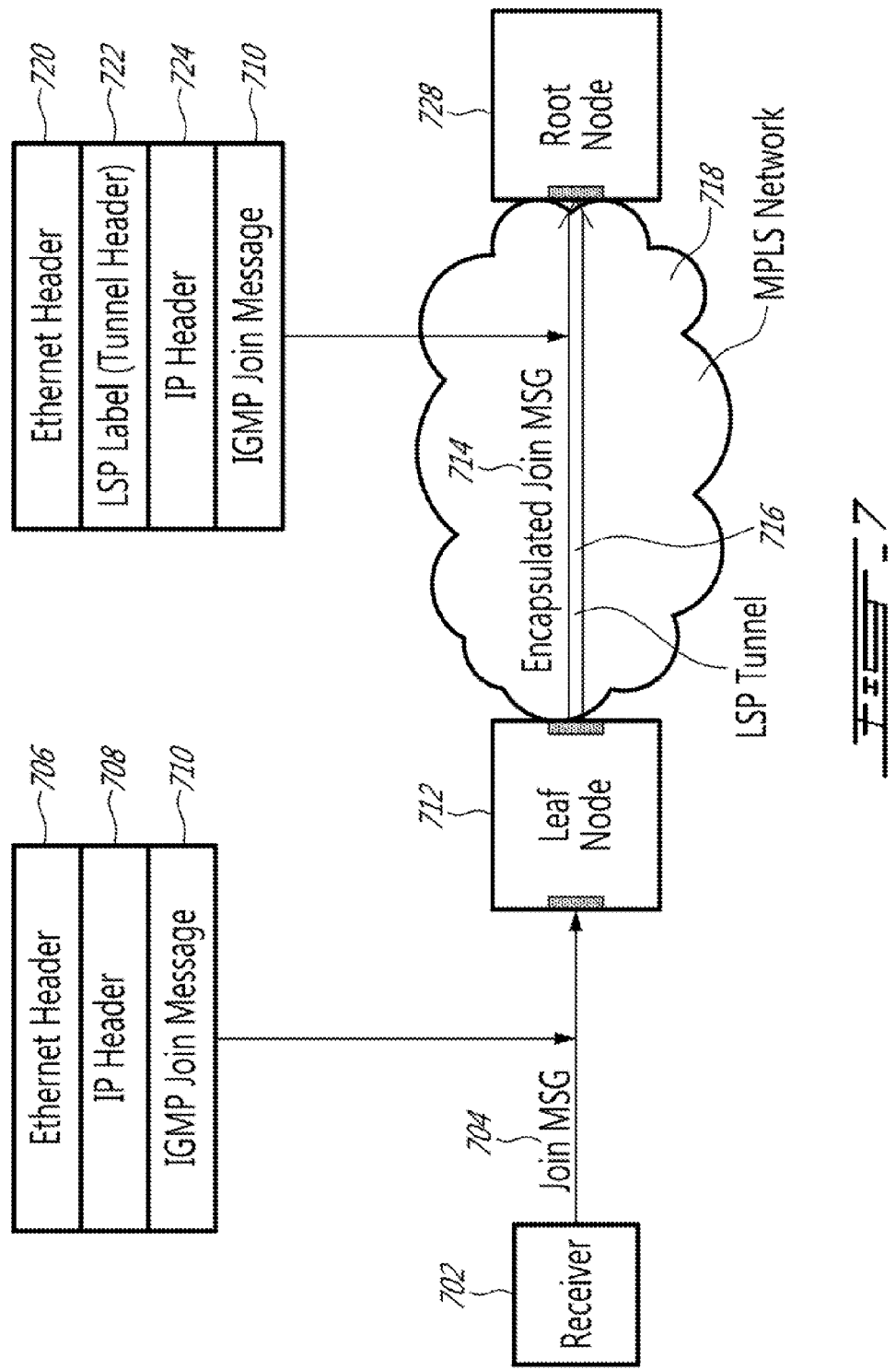
FIG. 7 illustrates an example procedure for encapsulating a message.

FIG. 7 illustrates an example embodiment of a method for encapsulating a join or leave message by a leaf node of the present invention. In general, encapsulation is a process where an original message is placed in the payload of a tunnel packet to be sent via the tunnel. In this example, Ethernet is used as the transport layer and LSP tunnel is used as an example tunnel. Those skilled in the art will appreciate that other transport layers or tunnels can be used and the message formats are simplified for illustrative purposes. Leaf node 712 receives a Join message 704 from Receiver 702. The format of the Join message 706 includes Ethernet Header 706, IP Header 708 and IGMP join message 710. The leaf node 712 encapsulates the received message 704 and sends an Encapsulated Join message 714 through LSP Tunnel 716 in the MPLS network 718. The format of the Encapsulated Join Message 714 includes Ethernet Header 720, LSP Label (Tunnel Header) 722, IP Header 724 and IGMP join message 710. Note that the Ethernet header 720 in the tunneled message 714 is different than the Ethernet header 706 of the original Join message 704, with different source and destination MAC addresses, different Ethernet type, etc. The IGMP join message 710 is replicated from Join message 704 to Encapsulated Join message 714. In this example, the IP Header 708 is also replicated as IP Header 724 in the Encapsulated Join message 714, although in other embodiments they may be different. The Encapsulated Join message 714 is received by root node 728 through the LSP tunnel 716.

As discussed in the various exemplary embodiments, the root node 728 can identify the leaf node 712 responsible for transmitting the Encapsulated Join message 714 from the information in the Tunnel Header 722. Root node 728 can identify a requested multicast group from information in the IGMP join message 710.

The exemplary network node 200 as described in FIG. 2 can be used to implement any of the embodiments as described in FIGS. 3 through 6. As a leaf node, node 200 can detect a trigger to join or leave a multicast group at its network interface 280. The trigger can be the reception of a join or leave request message. The request message can include an identifier for a multicast group. The processor 250 can select a pre-configured tunnel in accordance with the requested multicast group indicated by the received request message by accessing the tunnel database 227 stored in the memory 240. The pre-configured tunnel can be selected by a look-up operation. The processor 250 can encapsulate the received message and instruct the network interface 280 to transmit it through the selected pre-configured tunnel.

As a root node, node 200 can receive a join or leave request message delivered through a tunnel at its network interface 280. The processor 250 can identify the leaf node responsible for sending the request by the tunnel header of the received request message. The processor 250 can determine the multicast group the leaf node is requesting to join or leave by extracting information from the received message. The processor 250 can determine if a P2MP LSP exists for the requested multicast group by comparing the exacted information from the received message with information stored in a database in the memory 240. The database can include a multicast group identifier, membership information for the multicast group, and information about any P2MP LSPs that exist for the multicast group, if any. The processor 250 can instruct to add or remove the leaf node from a P2MP LSP using the RSVP-TE module 221 of the memory 240, and RSVP-TE messages can be sent via the network interface 280. The node 200 can establish a new P2MP LSP if the leaf node is the first node to join the P2MP LSP, or the node 200 can destroy a P2MP LSP if the leaf node is the last node to leave the P2MP LSP.

Based upon the foregoing, it should now be apparent to those of ordinary skill in the art that the present invention provides an advantageous solution. Although the system and method of the present invention have been described with particular reference to certain type of messages and nodes, it should be realized upon reference hereto that the innovative teachings contained herein are not necessarily limited thereto and may be implemented advantageously in various manners. It is believed that the operation and construction of the present invention will be apparent from the foregoing description.

Embodiments of the invention may be represented as a software product stored in a non-transitory machine-readable medium (also referred to as a computer-readable medium, a processor-readable medium, or a computer-usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A method for initiating an update of a multicast group, by a leaf node, the method comprising:
    receiving a request for a multicast group, the request including an identifier for the multicast group;
    selecting a pre-configured tunnel in accordance with the identifier for the multicast group;
    encapsulating the received request; and
    transmitting the encapsulated request through the selected pre-configured tunnel without specifying an end point of the pre-configured tunnel as a destination address for the encapsulated request.

2. The method of claim 1, wherein the received request is a join request message.

3. The method of claim 1, wherein the received request is a leave request message.

4. The method of claim 1, wherein at least one of Internet Group Management Protocol (IGMP) snooping, Multicast Listener Detection (MLD) snooping, and Protocol Independent Multicast (PIM) snooping is used to detect the request.

5. The method of claim 1, wherein the step of encapsulating includes placing the received request in a payload of a tunnel packet.

6. The method of claim 1, wherein the pre-configured tunnel allows the encapsulated request to travel to the destination without interception by an intermediate node.

7. A method for updating a multicast group, by a root node, the method comprising:
    receiving a request through a tunnel, the request including an identifier for a multicast group;
    identifying a leaf node responsible for transmitting the request in accordance with a tunnel header of the received request;
    determining if a Point-to-Multipoint (P2MP) Label Switched Path (LSP) exists for the multicast group; and
    in response to the multicast group having an existing P2MP LSP, updating a membership of the multicast group by one of adding the leaf node to the multicast group or removing the leaf node from the multicast group in accordance with the received request.

8. The method of claim 7, wherein the leaf node is added to the P2MP LSP using Resource Reservation Protocol-Traffic Engineering (RSVP-TE).

9. The method of claim 7, wherein the identifier for the multicast group is extracted from a payload of the received request.

10. The method of claim 9, wherein the multicast group is extracted using at least one of Internet Group Management Protocol (IGMP) snooping, Multicast Listener Detection (MLD) snooping, and Protocol Independent Multicast (PIM) snooping.

11. The method of claim 7, wherein, in response to the multicast group not having an existing P2MP LSP, establishing a new P2MP LSP for the multicast group including the leaf node.

12. The method of claim 7, wherein, in response to the leaf node being the last node to leave the P2MP LSP, terminating the P2MP LSP for the multicast group.

13. A leaf node comprising:
    a network interface for receiving a request for a multicast group, the request including an identifier for the multicast group;
    a memory for storing a tunnel database; and
    a processor for selecting a pre-configured tunnel from the tunnel database in accordance with the identifier for the multicast group, encapsulating the received request, and instructing the network interface to transmit the encapsulated request through the selected pre-configured tunnel without specifying an end point of the pre-configured tunnel as a destination address for the encapsulated request.

14. The leaf node of claim 13, wherein the received request is at least one of a join request message and a leave request message.

15. The leaf node of claim 13, wherein the leaf node uses at least one of Internet Group Management Protocol (IGMP) snooping, Multicast Listener Detection (MLD) snooping, and Protocol Independent Multicast (PIM) snooping to detect the request.

16. A root node, comprising:
    a network interface for receiving, through a tunnel, a request for updating a multicast group;
    a memory for storing a database including a multicast group identifier, a multicast group membership, and any associated Point-to-Multipoint (P2MP) Label Switched Path (LSP); and
    a processor for identifying a leaf node responsible for transmitting the request in accordance with a tunnel header of the received request; determining if an associated P2MP LSP exists for the requested multicast group; and in response to the requested multicast group having an existing associated P2MP LSP, updating the multicast group membership, by one of adding the leaf node to the multicast group or removing the leaf node from the multicast group, in accordance with the received request.

17. The root node of claim 16, wherein the leaf node is added to the P2MP LSP using Resource Reservation Protocol-Traffic Engineering (RSVP-TE).

18. The root node of claim 16, wherein, in response to the requested multicast group not having an existing associated P2MP LSP, the processor instructs for the establishment of a new P2MP LSP for the requested multicast group including the leaf node.

19. The root node of claim 16, wherein, in response to the leaf node being the last node to leave the requested multicast group, the processor instructs for the termination of the associated P2MP LSP for the requested multicast group.

* * * * *